US010166727B2

(12) United States Patent
Chaplin et al.

(10) Patent No.: US 10,166,727 B2
(45) Date of Patent: Jan. 1, 2019

(54) POLYMERIC MATERIALS (71) Applicant: VICTREX MANUFACTURING LIMITED, Lancashire (GB)

(72) Inventors: Adam Chaplin, Lancashire (GB); Alan Wood, Cumbria (GB); Alice Victoria Mary Matthews, Lancashire (GB)

(73) Assignee: VICTREX MANUFACTURING LIMITED, Lancashire (GB)

( * ) Notice: Subject to any disclaimer, the term of this patent is extended or adjusted under 35 U.S.C. 154(b) by 126 days.

(21) Appl. No.: 15/120,299

(22) PCT Filed: Feb. 13, 2015

(86) PCT No.: PCT/GB2015/050400
§ 371 (c)(1),
(2) Date: Aug. 19, 2016

(87) PCT Pub. No.: WO2015/124903
PCT Pub. Date: Aug. 27, 2015

(65) Prior Publication Data
US 2017/0057163 A1 Mar. 2, 2017

(30) Foreign Application Priority Data
Feb. 24, 2014 (GB) .................................. 1403201.5

(51) Int. Cl.
B29C 64/153 (2017.01)
B29C 64/357 (2017.01)
(Continued)

(52) U.S. Cl.
CPC ........ B29C 67/0077 (2013.01); B29C 64/153 (2017.08); B29C 64/35 (2017.08);
(Continued)

(58) Field of Classification Search
None
See application file for complete search history.

(56) References Cited

U.S. PATENT DOCUMENTS 4,717,761 A 1/1988 Staniland
4,766,197 A 8/1988 Clendinning et al.
(Continued)

FOREIGN PATENT DOCUMENTS

CN 101300094 A 11/2008
CN 101659119 A 3/2010
(Continued)

OTHER PUBLICATIONS

International Search Report (PCT/ISA/210) dated Apr. 29, 2015, by the European Patent Office as the International Searching Authority for International Application No. PCT/GB2015/050400.
(Continued)

Primary Examiner — Mary Lynn F Theisen
(74) Attorney, Agent, or Firm — Buchanan, Ingersoll & Rooney PC (57) ABSTRACT A process for manufacturing an object by laser sintering comprises:
(i) selecting a powder comprising a polymeric material having a repeat unit of formula

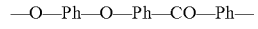

I and a repeat unit of formula

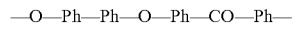

II wherein Ph represents a phenylene moiety; and
(ii) selectively sintering the powder to produce the object. It is found that the polymer used can be advantageously recycled and blended with virgin material to produce a blend which has very similar mechanical properties and crystal- (Continued)

linity compared to the virgin material. Thus, the polymer may be cost-effectively used in laser sintering.

19 Claims, 2 Drawing Sheets (51) Int. Cl.
| | |
|---|---|
| *B33Y 10/00* | (2015.01) |
| *B33Y 30/00* | (2015.01) |
| *B33Y 70/00* | (2015.01) |
| *C08G 65/40* | (2006.01) |
| *B29C 67/00* | (2017.01) |
| *C08L 71/00* | (2006.01) |
| *B29C 64/35* | (2017.01) |

(52) U.S. Cl.
CPC ............ *B29C 64/357* (2017.08); *B33Y 10/00* (2014.12); *B33Y 30/00* (2014.12); *B33Y 70/00* (2014.12); *C08G 65/4012* (2013.01); *C08L 71/00* (2013.01); *C08G 2650/40* (2013.01)

(56) References Cited

U.S. PATENT DOCUMENTS

| | | | |
|---|---|---|---|
| 4,829,143 | A | 5/1989 | Clendinning et al. |
| 10,000,022 | B2* | 6/2018 | DeFelice ............... B29C 67/04 |
| 2002/0090410 | A1* | 7/2002 | Tochimoto ............ B29C 64/165 |
| | | | 425/215 |
| 2008/0211132 | A1 | 9/2008 | Feenstra |
| 2009/0312454 | A1 | 12/2009 | Leuterer et al. |
| 2011/0104417 | A1 | 5/2011 | Wang et al. |
| 2012/0090874 | A1 | 4/2012 | Pagliuca et al. |
| 2014/0235787 | A1 | 8/2014 | Capra et al. |
| 2015/0328665 | A1 | 11/2015 | DeFelice et al. |
| 2016/0152769 | A1* | 6/2016 | Wilson ................. C08G 65/40 |
| | | | 524/592 |

FOREIGN PATENT DOCUMENTS

| | | |
|---|---|---|
| EP | 0 184 458 A2 | 6/1986 |
| EP | 0 266 132 A2 | 5/1988 |
| EP | 2 123 430 A1 | 11/2009 |
| GB | 2471322 A | 12/2010 |
| GB | 2495624 A | 4/2013 |
| IL | 80737 A | 6/1991 |
| WO | WO 2014/100320 A1 | 6/2014 |

OTHER PUBLICATIONS

Written Opinion (PCT/ISA/237) dated Apr. 29, 2015, by the European Patent Office as the International Searching Authority for International Application No. PCT/GB2015/050400.

Search Report dated Aug. 27, 2014, by the Great Britain Intellectual Property Office in corresponding Patent Application No. GB1403201.5.

Ghita et al. "Physico-chemical behaviour of Poly (Ether Ketone) (PEK) in High Temperature Laser Sintering (HT-LS)", Journal of Materials Processing Technology, Elsevier, NL, vol. 214, No. 4, Nov. 15, 2013 (Nov. 15, 2013), pp. 969-978.

* cited by examiner

POLYMERIC MATERIALS

This invention relates to polymeric materials and particularly, although not exclusively, relates to a process for manufacturing objects from a polymeric powder by sintering using electromagnetic radiation.

Methods in which a quick manufacturing of prototype parts starting from construction data are referred to as rapid prototyping methods. Usually the part to be manufactured is built layer-wise from a shapeless material or a material that is neutral with respect to shape. For the case that the original material is in powder form, such methods are for example known under the names 3D-laser sintering, 3D-laser melting or 3D-printing. Here, metals, ceramics and plastics are used as basic materials. For instance, U.S. Pat. No. 5,730,925 describes a laser sintering method, in which layers of a powder are applied onto a support that can be vertically moved and in which the layers are selectively sintered at the positions corresponding to the cross-section of the object to be manufactured by means of a laser.

Figure 1:
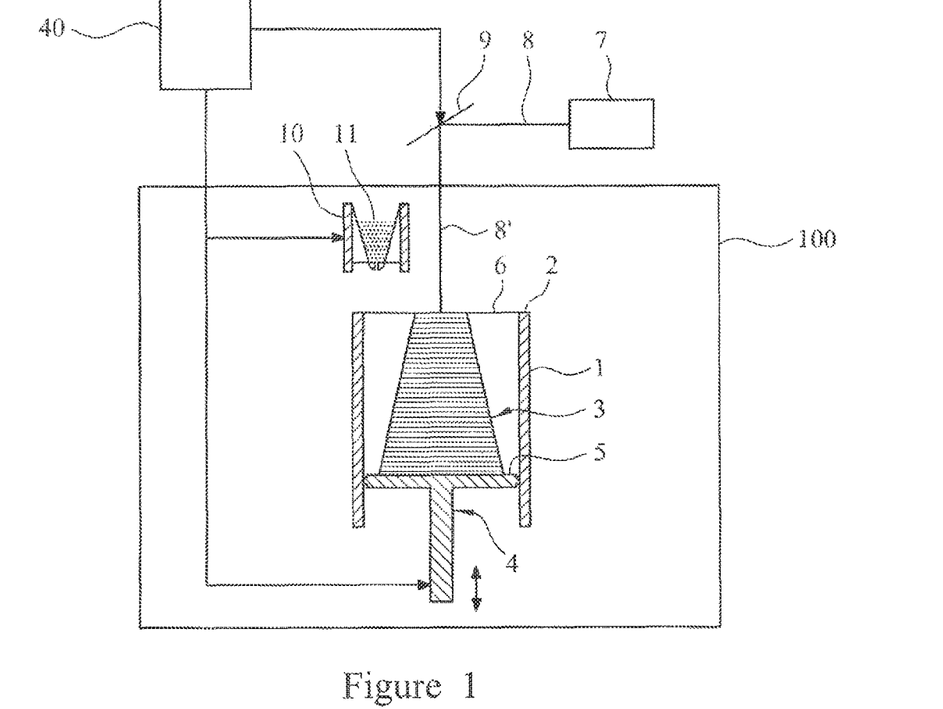
FIG. 1 is a laser sintering device for layer-wise manufacturing of a three-dimensional object.

FIG. 1 shows a laser sintering device by means of which a method for a layer-wise manufacturing of a three-dimensional object may be performed. The device comprises a container 1 which is open to the top and is limited at the bottom by a support 4 for supporting an object 3 to be formed. By the upper edge 2 of the container (or by its sidewalls) a work plane 6 is defined. The object is located on the top side of the support 4 and is formed from a plurality of layers of a building material in powder form that can be solidified by means of electromagnetic radiation, which layers are in parallel to the top side of the support 4. The support may be moved in a vertical direction via a height adjustment device so the position of the support 4 relative to the work plane 6 can be adjusted.

Above the work plane 6, an application device 10 is provided for applying the powder material 11 to be solidified onto the support surface 5 or a previously solidified layer. Also, an irradiation device in the form of a laser 7, which emits a directed light beam 8, is arranged above the work plane 6. This light beam 8 is directed as deflected beam 8' towards the work plane 6 by a deflection device 9 such as a rotating mirror.

When the three-dimensional object 3 is manufactured, the powder material 11 is applied layer-wise onto the support 4 or a previously solidified layer and is solidified at the positions of each powder layer that correspond to the object by means of the laser beam 8'. After each selective solidification of a layer, the support is lowered by the thickness of the powder layer to be subsequently applied.

Many modifications of processes and devices for manufacturing a three-dimensional object by selective sintering by means of electromagnetic radiation compared to the system described above exist, which can also be used. For example, instead of using a laser and/or a light beam, other systems to selectively deliver electromagnetic radiation could be used, such as, e.g., mask exposure systems or the like.

A wide range of different types of polymeric materials has been proposed for use in laser sintering. In relatively recent times, one of the leading innovators in the field of laser sintering (EOS GmbH/EOS Systems Ltd) has focussed on polyaryletherketone (PAEK)-based polymers. The reason is that parts that have been manufactured from PAEK powder or PAEK granulates are characterized by a low flammability, a good biocompatibility as well as a high resistance against hydrolysis and radiation. It is the thermal resistance also at elevated temperatures as well as the chemical resistance that distinguishes PAEK powders from ordinary plastic powders. Due to these properties, there is a high demand for PAEK materials particularly in the aerospace industry, in the automotive industry and in the electronic industry as well as the medical industry.

U.S. Pat. No. 7,847,057B sets out to improve powder properties of PAEK powders to improve uniformly and evenness of an applied layer to improve accuracy of manufacturing of parts by laser sintering. In general statements, the publication refers to polyaryletherketones and makes reference to the group consisting of polyetheretherketone (PEEK), polyetherketoneketone (PEKK), polyetherketone (PEK), polyetheretherketoneketone (PEEKK) and polyetherketoneetherketoneketone (PEKEKK). However, the only polyaryletherketone specifically exemplified and tested is polyetheretherketone (PEEK).

EP2123430A seeks to address the problem of providing an improved process for producing an object by selective sintering which leads to improved mechanical properties. The problem is said to be solved by producing objects having a specific range of crystallinity and the publication says "the advantages of the invention are particularly feasible when polyaryletherketone polymer or a polyaryletherketone copolymer, or when a polyamide polymer or a polyamide copolymer is appropriately used as a polymer material of the polymer powder. The document goes on to make wide-ranging generic statements which define an infinite array of allegedly suitable polymers. More focused statements (e.g. claim 15) describe a type of polymer or copolymer of polyamide (PA), polyaryletherketone (PAEK), polyarylethersulfone (PAES), polyester, polyether, polyolefin, polystyrene, polyphenylenesulfide, polyvinylidenfluoride, polyphenylenoxide, polyimide and copolymers comprising at least one of the aforementioned polymers, preferably a polymer or copolymer of polyaryletherketone or polyamide, more preferably polyaryletherketone(PAEK)/polyarylethersulfon(PAES)-diblock-copolymers or PAEK/PAES/PAEK-triblock-copolymers and in particular polyetherketone (PEK)/polyethersulfone(PES)-diblock-copolymers or PEK/PES/PEK-triblock-copolymers. The only polymers specifically identified in the publication are polyetheretherketone (PEEK) and polyetherketone (PEK).

EP2145913A seeks to improve mechanical properties of objects manufactured by laser sintering of a polymer or copolymer, wherein the polymer or copolymer is modified by incorporation of branching groups in the polymeric backbone, modification of end groups, incorporation of bulky groups or providing "at least one aromatic group non-linearly linking the backbone chain". The publication includes a wide-ranging generic disclosure. However, its examples only describe a very small number of specific materials—e.g. "a structurally modified PAEK" (Example 1), a modified PEEK/PEK copolymer (Example 2), a powder based on polyamide PA6-3-T (Example 3), structurally modified polyethylene PE-LLD (Example 4), structurally modified polyethylene PE-HD (Example 5) and thermally treated PEEK (Examples 6 & 7).

Another major company with an interest in materials for laser sintering is Degussa (now Evonik) who describes in US2006/0134419A, a polymer powder containing polyaryletherketone. The wide-ranging generic disclosure focusses, at [0080], on polyaryletherketones selected from PEEK, PEK, PEKK and PEEKK although the only polymer specifically exemplified is PEEK.

It should be appreciated that, in laser sintering, a mass comprising polymeric material is held at an elevated temperature below its sintering temperature before being applied to a support surface 5 (FIG. 1) or a previously solidified layer. Then, only part of the polymeric material is sintered to define a layer of the object, with the non-sintered material potentially being waste material. However, polymeric materials such as PAEKs are expensive and, for economic factors at least, it is desirable to be able to recycle polymeric material which is not sintered and re-use it in manufacturing another object by laser sintering. However, it is found that laser sintered objects made from a combination of virgin polymeric material and recycled polymeric material may disadvantageously have inferior mechanical properties compared to objects made from 100% virgin polymer.

Journal of Materials Processing Technology, Volume 214, Issue 4, April 2014, Pages 969-978 "Physico-chemical behaviour of Poly (Ether Ketone) (PEK) in High Temperature Laser Sintering (HT-LS)" O.R. Ghita, E. James, R. Trimble, K. E. Evans describes research undertaken in relation to polyetherketone (PEK) sold by EOS GmbH under the identifier HP3 in laser sintering. In particular, the paper assesses mixtures of virgin PEK and recycled PEK and describes the effect of use of recycled PEK on mechanical properties of objects made by laser sintering from the mixture. The abstract concludes "the incorporation of 30% used HP3 PEK powder led to an approximately 17% drop in tensile strength".

It is desirable for mechanical properties, for example tensile strength, of objects produced from mixtures of virgin and recycled polymeric materials in laser sintering to be as close as possible to the properties of objects produced using 100% virgin polymeric material, so polymeric materials for laser sintering can be recycled one or more times with low impact on mechanical properties.

It is an object of preferred embodiments of the invention to address the above described problems.

It is an object of preferred embodiments of the present invention to provide a polymeric material which can advantageously be used in processes which involve selective sintering of the polymeric material using radiation to produce a three-dimensional object.

According to a first aspect of the invention, there is provided a process for manufacturing an object, the process comprising:
(i) selecting a powder comprising a polymeric material having a repeat unit of formula —O—Ph—O—Ph—CO—Ph—  I and a repeat unit of formula —O—Ph—Ph—O—Ph—CO—Ph—  II wherein Ph represents a phenylene moiety; and
(ii) selectively sintering the powder to produce the object.

Said repeat units I and II are preferably in the relative molar proportions I:II of from 65:35 to 95:5.

The phenylene moieties (Ph) in each repeat unit I and II may independently have 1,4-para linkages to atoms to which they are bonded or 1,3-meta linkages. Where a phenylene moiety includes 1,3-linkages, the moiety will be in the amorphous phase of the polymer. Crystalline phases will include phenylene moieties with 1,4-linkages. In many applications it is preferred for the polymeric material to be highly crystalline and, accordingly, the polymeric material preferably includes high levels of phenylene moieties with 1,4-linkages.

In a preferred embodiment, at least 95%, preferably at least 99%, of the number of phenylene moieties (Ph) in the repeat unit of formula I have 1,4-linkages to moieties to which it is bonded. It is especially preferred that each phenylene moiety in the repeat unit of formula II has 1,4-linkages to moieties to which it is bonded.

In a preferred embodiment, at least 95%, preferably at least 99%, of the number of phenylene moieties (Ph) in the repeat unit of formula II have 1,4-linkages to moieties to which they are bonded. It is especially preferred that each phenylene moiety in the repeat unit of formula II has 1,4-linkages to moieties to which it is bonded.

Preferably, the phenylene moieties in repeat unit of formula I are unsubstituted.
Preferably, the phenylene moieties in repeat unit of formula II are unsubstituted.

Said repeat unit of formula I suitably has the structure

III

Said repeat unit of formula II suitably has the structure

IV

Said polymeric material may include at least 68 mol %, preferably at least 71 mol % of repeat units of formula III. Particular advantageous polymeric materials may include at least 72 mol %, or, especially, at least 74 mol % of repeat units of formula III. Said polymeric material may include less than 90 mol %, suitably 82 mol % or less of repeat units of formula III. Said polymeric material may include 68 to 82 mol %, preferably 70 to 80 mol %, more preferably 72 to 77 mol % of units of formula III.

Said polymeric material may include at least 10 mol %, preferably at least 18 mol %, of repeat units of formula IV. Said polymeric material may include less than 32 mol %, preferably less than 29 mol % of repeat units of formula IV. Particularly advantageous polymeric materials may include 28 mol % or less; or 26 mol % or less of repeat units of formula IV. Said polymeric material may include 18 to 32 mol %, preferably 20 to 30 mol %, more preferably 23 to 28 mol % of units of formula IV.

The sum of the mol % of units of formula III and IV in said polymeric material is suitably at least 95 mol %, is preferably at least 98 mol %, is more preferably at least 99 mol % and, especially, is about 100 mol %.

The ratio defined as the mol % of units of formula III divided by the mol % of units of formula IV may be in the range 1.8 to 5.6, is suitably in the range 2.3 to 4 and is preferably in the range 2.6 to 3.3.

The Tm of said polymeric material may be less than 330° C., is suitably less than 320° C., is preferably less than 310° C. In some embodiments, the Tm may be less than 306° C. The Tm may be greater than 280° C., or greater than 290° C., 295° C. or 300° C. The Tm is preferably in the range 300° C. to 310° C.

In a preferred embodiment, said polymeric material has a Tg in the range 145° C.-155° C., a Tm in the range 300° C. to 310° C. and the difference between the Tm and Tg is in the range 145° C. to 165° C.

Said polymeric material is preferably semi-crystalline.

A skilled person can readily assess whether a polymer is semi-crystalline, for example, by wide angle X-ray diffraction (also referred to as Wide Angle X-ray Scattering or WAXS) or by Differential Scanning Calorimetry (DSC).

More particularly, the level and extent of crystallinity in a polymer may be measured by wide angle X-ray diffraction, for example as described by Blundell and Osborn (Polymer 24, 953, 1983); or by DSC in a process which is also described in POLYMER Vol. 37, Number 20, 1996, page 4573.

DSC may be used to examine the crystallinity in a polymer. From a DSC trace the onset of the Tg may be obtained as the intersection of lines drawn along the pre-transition baseline and a line drawn along the greatest slope obtained during the transition. The Tn is the temperature at which the main peak of the cold crystallisation exotherm reaches a maximum. The Tm is the temperature at which the main peak of the melting endotherm reaches a maximum. The Tc is the temperature at which the main peak of the crystallisation from the melt exotherm reaches a maximum.

The Heat of Fusion ($\Delta H$ (J/g)) may be obtained by connecting the two points at which the melting endotherm deviates from the relatively straight baseline. The integrated area under the endotherm as a function of time yields the enthalpy (mJ) of the transition, the mass normalised Heat of Fusion is calculated by dividing the enthalpy by the mass of the specimen (J/g). The level of crystallisation (%) is determined by dividing the Heat of Fusion of the specimen by the Heat of Fusion of a totally crystalline polymer.

The level of crystallinity in said polymeric material in said powder may be at least 15%, suitably at least 20%, preferably at least 25%. The level of crystallinity may be less than 50% or less than 35%

The level of crystallinity of said polymeric material in said object may be at least 15%, suitably at least 20%, preferably at least 25%. The level of crystallinity may be less than 50% or less than 35%.

The aforementioned methods provide the level of crystallinity in a bulk sample. As an alternative, FTIR may be used to assess crystallinity and this may be used to assess the level of crystallinity at a surface and/or across the thickness or surface of a sample. Reference is made to a paper titled "Crystallinity in Poly(Aryl-Ether-Ketone) Plaques Studied by Multiple Internal Reflection Spectroscopy" (Polymer Bull, 11, 433 (1984)). The crystallinity at the surface of the polymeric material or object described herein may be at the same levels described above.

In a preferred embodiment, DSC may be used to measure crystallinity of a bulk sample. FTIR may be used to measure crystallinity at a surface.

Said polymeric material suitably has a melt viscosity (MV) of at least 0.10 $kNsm^{-2}$, preferably has a MV of at least 0.15 $kNsm^{-2}$, more preferably at least 0.20 $kNsm^{-2}$, especially at least 0.25 $kNsm^{-2}$. MV of said polymeric material is suitably measured using capillary rheometry operating at 340° C. at a shear rate of $1000s^{-1}$ using a tungsten carbide die, 0.5 mm×3.175 mm. Said polymeric material material may have a MV of less than 1.8 $kNsm^{-2}$, suitably less than 1.2 $kNsm^{-2}$.

Said powder may comprise said polymeric material and a filler. Said filler may include a fibrous filler or a non-fibrous filler. Said filler may include both a fibrous filler and a non-fibrous filler. A said fibrous filler may be continuous or discontinuous.

A said fibrous filler may be selected from inorganic fibrous materials, non-melting and high-melting organic fibrous materials, such as aramid fibres, and carbon fibre.

A said fibrous filler may be selected from glass fibre, carbon fibre, asbestos fibre, silica fibre, alumina fibre, zirconia fibre, boron nitride fibre, silicon nitride fibre, boron fibre, fluorocarbon resin fibre and potassium titanate fibre. Preferred fibrous fillers are glass fibre and carbon fibre.

A fibrous filler may comprise nanofibres.

A said non-fibrous filler may be selected from mica, silica, talc, alumina, kaolin, calcium sulfate, calcium carbonate, titanium oxide, ferrite, clay, glass powder, zinc oxide, nickel carbonate, iron oxide, quartz powder, magnesium carbonate, fluorocarbon resin, graphite, carbon powder, ceramic powder, metal powder, flame retardants, nanotubes and barium sulfate. The non-fibrous fillers may be introduced in the form of powder or flaky particles.

Said powder may include up to 60 wt % filler, for example up to 40 wt % filler. The filler level may be in the range 0-60 wt %, suitably 10-60 wt %, for example 15-40 wt %.

Said powder may comprise a radiation absorber which may have uniform distribution within particles of the powder or have high concentration in the interior or close to the surface of the powder.

The powder suitably comprises from 0 to 30 wt % of an absorber, preferably from 0 to 20 wt % of an absorber, more preferably from 0 to 15 wt % of an absorber, and, especially from 0 to 10 wt % of an absorber. In some embodiments, said powder may include at least 0.1 wt % of an absorber.

The absorber present in the powder preferably comprises carbon black or CHP (copper hydroxide phosphate), or chalk, animal charcoal, carbon fibers, graphite, flame retardant, or interference pigments.

Said powder suitably comprises 60 to 100 wt %, preferably 70 to 100 wt %, more preferably 85 to 100 wt %, especially 95 to 100 wt % of said polymeric material.

The process is preferably for manufacturing a three-dimensional object. The process preferably includes selectively sintering the powder by means of electromagnetic radiation. The electromagnetic radiation is preferably provided by a laser. Application of said electromagnetic radiation is preferably controlled by a computer to selectively sinter the powder to define the object.

In the process, the powder is preferably heated to (and preferably maintained at) a temperature above ambient temperature prior to step (ii). The powder may be heated to (and preferably maintained at) a temperature of at least 100° C., suitably at least 200° C., preferably at least 250° C., more preferably at least 280° C. The powder may be heated to (and preferably maintained at) a temperature of less than the Tm (e.g. at least 2° C., or at least 4° C. less than the Tm) of the polymeric material prior to step (ii). The powder may be heated to (and preferably maintained at) a temperature which is less than 300° C., preferably less than 297° C. prior to step (ii). Sintering the powder in step (ii) preferably takes place with the powder maintained at an elevated temperature as aforesaid. The process may include maintaining a bed of powder to be sintered at said elevated temperature and sintering the powder as described in step (ii).

The process is preferably carried out layer-wise in an additive process. Thus, step (ii) is suitably undertaken multiple times so successive layers of the object to be formed from the powder are solidified by the electromagnetic radiation at positions corresponding to the cross-section of the object.

Said powder may have a $D_{50}$ measured as described in Example 4 of at least 1 μm, preferably at least 25 μm. The $D_{50}$ may be less than 500 μm, preferably less than 250 μm, especially less than 100 μm.

Said object is suitably made up of at least 90 wt %, for example at least 95 wt %, at least 99 wt % or 100 wt % of said powder.

Said object may have a crystallinity measured as described in Example 3 of at least 20%. The crystallinity may be 35% or less.

To achieve optimized crystallinity, the process may comprise a predetermined and/or controlled cooling step after the object has been defined and/or after all sintering of the powder has been completed.

The object may have a porosity of less than 10%, preferably less than 5%, more preferably less than 3%, especially less than 2%. Porosity may be calculated as described at [0064]et seq of U.S. Ser. No. US2009/0312454.

Prior to step (ii) the powder may be tempered. Thus, step (ii) preferably comprises sintering tempered powder to produce the object. Tempering suitably improves the flow of the powder compared to untempered powder. Alternatively or additionally, flow aids may be included in the powder to improve its flow. Tempering of the powder may be undertaken as described in U.S. Pat. No. 7,847,057. Preferably, the process of the first aspect comprises maintaining a powder which may comprise or consist of said polymeric material (which is to define at least part of the powder to be used in the process of the first aspect) at a temperature of at least 170° C., suitably at least 190° C., preferably at least 210° C. (and preferably less than 280° C., more preferably less than 240° C.) for at least 1 hour, preferably at least 5 hours, more preferably at least 10 hours, especially at least 20 hours. Tempering may be undertaken for less than 48 hours.

Said powder selected in step (i) of the process of the first aspect preferably comprises recycled powder comprising said polymeric material. Thus, said powder preferably comprises polymeric material of the first aspect (i.e. having repeat units I and II as described) which has been recycled. Recycled powder (or polymeric material) is suitably powder (or polymeric material) which has previously been part of a bed of powder. Such a bed has suitably been held at an elevated temperature whilst step (ii) of the process is undertaken as aforesaid. Thus recycled powder (or polymeric material) is suitably powder (or polymeric material) which has been selected in step (i) of the process but which has not been sintered in step (ii) to produce the object. Thus, step (i) of the method may comprise:

(i)* selecting a first powder comprising recycled powder and/or recycled polymeric material.

Step (i) of the method may comprise step (i)* and the following step:

(i)** blending said first powder with a second powder wherein said second powder comprises said polymeric material and, preferably, said second powder and/or said polymeric material included in said second power is not recycled powder and/or is not recycled polymeric material which has been held at an elevated temperature whilst step (ii) of the process has previously been undertaken.

Polymeric material included in said second powder is herein referred to as virgin polymeric material. Step (i)** may comprise blending said first powder and said second powder to produce a blend so that the ratio of the parts by weight of virgin polymeric material of the type described divided by the parts by weight of recycled polymeric material of the type described is in the range 0 to 9, suitably in the range 0 to 5, preferably in the range 0.1 to 5, more preferably in the range 0.5 to 2, especially in the range 0.6 to 1.5. Advantageously, said ratio may be at least 0.9 meaning that high levels of recycled polymeric material may be used.

Said blend may include at least 10 wt %, suitably at least 20 wt %, preferably at least 30 wt %, especially at least 40 wt % of recycled polymeric material.

The process may comprise recycling powder and/or polymeric material which has itself previously been recycled.

According to a second aspect of the invention, there is provided apparatus for carrying out the process of the first aspect, wherein the apparatus includes a receptacle for containing a powder to be sintered, wherein said receptacle contains a powder comprising a polymeric material having a repeat unit of formula

I and a repeat unit of formula

II wherein Ph represents a phenylene moiety.

Said powder may have any feature of the powder of the first aspect. It may comprise recycled powder and/or recycled polymeric material as described. It may comprise a blend of first and second powder as described.

Said apparatus suitably comprises means for defining a layer of powder to be sintered. Said apparatus preferably comprises a source of electromagnetic radiation, for example a laser, for effecting step (ii) of the process of the first aspect.

According to a third aspect of the invention, there is provided a blend in the form of a powder, said blend comprising:

recycled polymeric material having a repeat unit of formula

I and a repeat unit of formula

II wherein Ph represents a phenylene moiety; and
virgin polymeric material having a repeat unit of formula

I and a repeat unit of formula

II wherein Ph represents a phenylene moiety.

Said recycled and virgin polymeric materials preferably have the same composition. Suitably, the only difference between the two polymeric materials is that one is virgin and the other has been recycled.

Said blend may be as described in the first aspect. For example, it may comprise a blend wherein the ratio of the parts by weight of virgin polymeric material of the type described divided by the parts by weight of recycled polymeric material of the type described is in the range 0 to 9, suitably in the range 0 to 5, preferably in the range 0.1 to 5, more preferably in the range 0.5 to 2, especially in the range 0.6 to 1.5.

According to a fourth aspect, there is provided an object produced by sintering powder comprising a polymeric material having a repeat unit of formula

I and a repeat unit of formula

II wherein Ph represents a phenylene moiety. The object is suitably produced in a process according to the first aspect.

A skilled person may be able to assess if a part has or has not been produced by sintering, in comparison to other processes such as moulding (e.g. injection or compression moulding) or machining by one or more of the following assessments:
(a) the porosity of the object being at least 1% or at least 2% calculated as described in U.S.2009/0312454;
(b) the crystallinity of the object determined as described herein is at least 25%;
(c) DSC trace of the polymeric material of the object includes no annealing peak;
(d) A lighter colour compared to a part made from an identical polymeric material by injection moulding.

Any feature described according to any aspect of any invention described herein may be combined with any other aspect of an invention described herein mutatis mutandis.

Specific embodiments of the invention will now be described, by way of example, with reference to the accompanying figures in which.

The following material(s) is/are referred to hereinafter:

HP3 powder—polyetherketone (PEK) powder specifically manufactured for additive manufacture and sold by EOS Systems Ltd.

In the following examples, the preparation and assessment of polyetheretherketone (PEEK)—polyetherdiphenyletherketone (PEDEK) is described in Examples 1 to 5; and virgin powder blends comprising virgin powder and recycled powder are assessed, in various tests, and compared to other polymeric materials used in laser sintering.

EXAMPLE 1

Preparation of Polyetheretherketone (Peek)-Polyetherdiphenyletherketone (Pedek) Copolymer A 300 litre vessel fitted with a lid, stirrer/stirrer guide, nitrogen inlet and outlet was charged with diphenylsulphone (125.52 kg) and heated to 150° C. Once fully melted 4,4'-diflurobenzophenone (44.82 kg, 205.4 mol), 1,4-dihydroxybenzene (16.518 kg, 150 mol) and 4,4'-dihydroxydiphenyl (9.311 kg, 50 mol) were charged to the vessel. The contents were then heated to 160° C. While maintaining a nitrogen blanket, dried sodium carbonate (21.368 kg, 201.6 mol) and potassium carbonate (1.106 kg, 8 mol), both sieved through a screen with a mesh of 500 micrometres, were added. The $D_{50}$ of the sodium carbonate was 98.7 μm. The temperature was raised to 180° C. at 1° C./min and held for 100 minutes. The temperature was raised to 200° C. at 1° C./min and held for 20 minutes. The temperature was raised to 305° C. at 1° C./min and held until desired melt viscosity was reached, as determined by the torque rise of the stirrer. The required torque rise was determined from a calibration graph of torque rise versus MV. The reaction mixture was poured via a band caster into a water bath, allowed to cool, milled and washed with acetone and water. The resulting polymer powder was dried in a tumble dryer until the contents temperature measured 112° C. The polymer had a Melt Viscosity (MV) as described in Example 2 of 0.26 kNsm$^{-2}$.

EXAMPLE 2

General Method for Determining Melt Viscosity (MV) of Polymer

Unless otherwise stated, this was measured using capillary rheometry operating at 340° C. at a shear rate of 1000 s$^{-1}$ using a tungsten carbide die, 0.5 mm×3.175 mm. The MV measurement was taken 5 minutes after the polymer had fully melted, which is taken to be 5 minutes after the polymer is loaded into the barrel of the rheometer.

EXAMPLE 3

Differential Scanning Calorimetry of PEEK-PEDEK Copolymer

Crystallinity referred to herein may be assessed by several methods for example by density, by IR spectroscopy, by X-ray diffraction or by differential scanning calorimetry (DSC). The DSC method has been used to evaluate the crystallinity of polymers described herein using a Mettler Toledo DSC1 Star system with FRS5 sensor.

The Glass Transition Temperature (Tg), the Melting Temperature (Tm) and Heat of Fusions of Melting (ΔHm) for the polymers described herein may be determined using the following DSC method.

A 8 mg sample of the polymer was heated from 30° C. to 400° C. at 20° C./min, held for 5 minutes, then cooled at 20° C./minute to 30° C. and held for 5 minutes at this temperature. From the DSC trace the onset Tg was obtained as the intersection of the lines drawn along the pre-transition baseline and a line drawn along the greatest slope obtained during the transition. The Tm was the temperature at which the main peak of the melting endotherm reached a maximum.

The Heat of Fusion for melting (ΔHm) was obtained by connecting the two points at which the melting endotherm deviates from the relatively straight baseline. The integrated area under the endotherm as a function of time yields the enthalpy (mJ) of the melting transition: the mass normalised heat of fusion is calculated by dividing the enthalpy by the mass of the specimen (J/g). The level of crystallisation (%) is determined by dividing the Heat of Fusion of the specimen by the Heat of Fusion of a totally crystalline polymer, which for polyetheretherketone is 130 J/g.

EXAMPLE 4

Manufacture of Powder

The powder prepared in Example 1 was milled to define a powder which had a $D_{10}$ of 21.8 μm, a $D_{50}$ of 49.5 μm and a $D_{90}$ of 86.2 μm. Particle size distribution was determined by light scattering analysis using a Micromeritics Saturn Digisizer 5200. The powder was dispersed in 6.7 g sodium hexametaphosphate and 1.3 g sodium hydrogen carbonate in 21 deionised water. Three repeats were taken for each example.

The powder had the following properties: MV=0.26 kNsm-2, Tg=151° C., Tm=307° C., Tc=250° C. and crystallinity (X%) of 24.4%.

EXAMPLE 5

Tempering of Powder

To temper the powder and improve its flow, the powder of Example 4 was heated for 24 hours at 220° C. and left to cool at ambient temperature.

EXAMPLE 6

General Procedure for Manufacturing Test Parts by Laser Sintering

An EOSINT P800 laser sintering system was used. It consists of two 50 W carbon dioxide lasers, a recoating mechanism, a heated piston, infrared lamps focused on the powder bed and a heated exchangeable frame.

The machine initially goes through a warm up stage where it gradually increases the temperature of the base powder to the process temperature within an inert gas atmosphere. After completion of the warm up stage, the machine starts the laser sintering build stage. During the laser sintering process, the powder is applied to the process bed by means of a recoating mechanism to give a layer thickness of 0.12 mm. The part contours are scanned by the carbon dioxide lasers and subsequently filled to complete the cross sectional layer of the CAD data. Once sintered, the material goes through a post-sintering stage where the powder layer is exposed to thermal radiation for a further 12 seconds during which the sintered powder grains finally flow to form a homogenous molten film. The piston then drops by the layer thickness and the recoating mechanism applies the next layer of powder. On completion of the build, the machine enters a cool down stage where it controls the cooling rate of the powder to room temperature. The powder which is not incorporated into the build (often referred to as "the cake") is subsequently recycled. At room temperature the exchangeable frame is removed from the machine and the parts are cleaned of unused powder.

EXAMPLE 7

Assessment of Effect of Different Laser Powers on Sintered Test Parts

Figure 2:
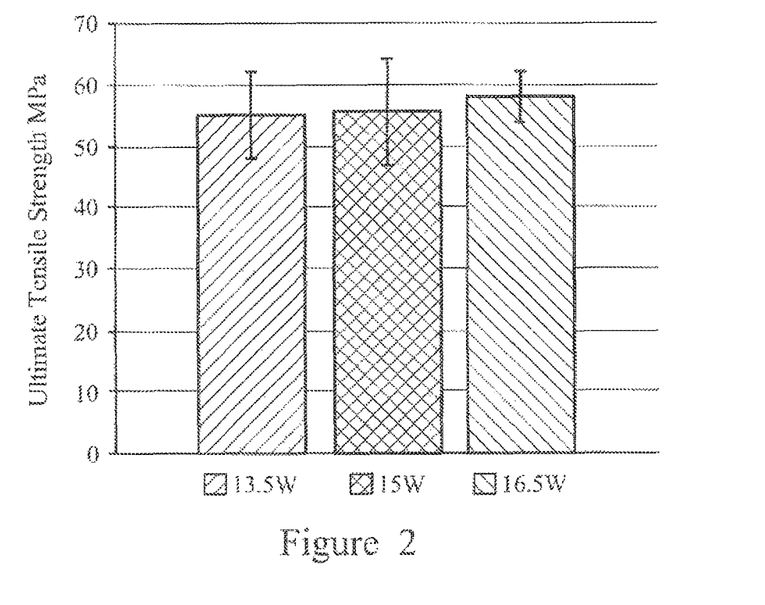
FIG. 2 is a representation of ultimate tensile strength of a part manufactured using three different laser powers.

The general procedure described in Example 6 was followed except that test parts were produced from the powder of Example 5, using different laser powers (13.5 W, 15 W and 16.5 W) to find the optimum laser power. Ultimate tensile strength of the test parts was assessed in accordance with ISO527. Results are presented in FIG. 2 from which it will be noted that there is a slight improvement in tensile strength on moving to higher laser power. A laser power of 16.5 W was used in the manufacture of subsequent test parts from virgin powder of the type described in Example 5.

EXAMPLE 8

Assessment of Mechanical Properties of Virgin and Recycled Materials

A recycled sample of the PEEK-PEDEK polymer of Example 1 was prepared using 50 wt % of powder which had been used in the procedure of Example 6 but not itself sintered and incorporated into a part (i.e. powder from the cake was used). This powder was blended with virgin powder (i.e. powder which has not previously been used in the laser sintering system) prepared as described in Example 5. Laser sintering of the homogenous blend was undertaken as described in Example 6, except that the optimized conditions used comprised sintering at 291° C. and laser power of 15 W. Tensile and Flexural properties of the 50:50 blend, assessed in accordance with ISO527 and ISO178 respectively, were compared with the properties of 100% virgin sintered material and the results are detailed below.

| Property | Unit | Virgin polymer of Example 5 | 50:50 blend of virgin and recycled polymer |
|---|---|---|---|
| Tensile Strength | MPa | 57.37 | 57.88 |
| Elongation at Break | % | 1.98 | 2.05 |
| Modulus | MPa | 2.99 | 2.94 |
| Flex Strength | MPa | 88.43 | 86.49 |
| Flex Strain | % | 2.96 | 2.92 |
| Flex Modulus | GPa | 3.08 | 3.07 |

EXAMPLES 9-11

Comparison of Properties of Blends Comprising Recycled PEEK-PEDEK with Blends Comprising Recycled Polyetherketone (PEK)

By a process analogous to that described in Example 8, test parts were made from virgin PEK (using commercially available EOS HP3 powder) and from blends comprising virgin PEK and recycled PEK. In each case, an optimized sintering temperature and laser power was used. The aforementioned were compared to the PEEK-PEDEK materials of Example 6. A summary of the composition of the examples is provided in the table below.

| Example No. | Composition |
|---|---|
| 9 | 50 wt % recycled PEEK-PEDEK and 50 wt % virgin PEEK-PEDEK |
| 10 | 20 wt % recycled PEK and 80 wt % virgin PEK |
| 11 | 30 wt % recycled PEK and 70 wt % virgin PEK |

Figure 3:
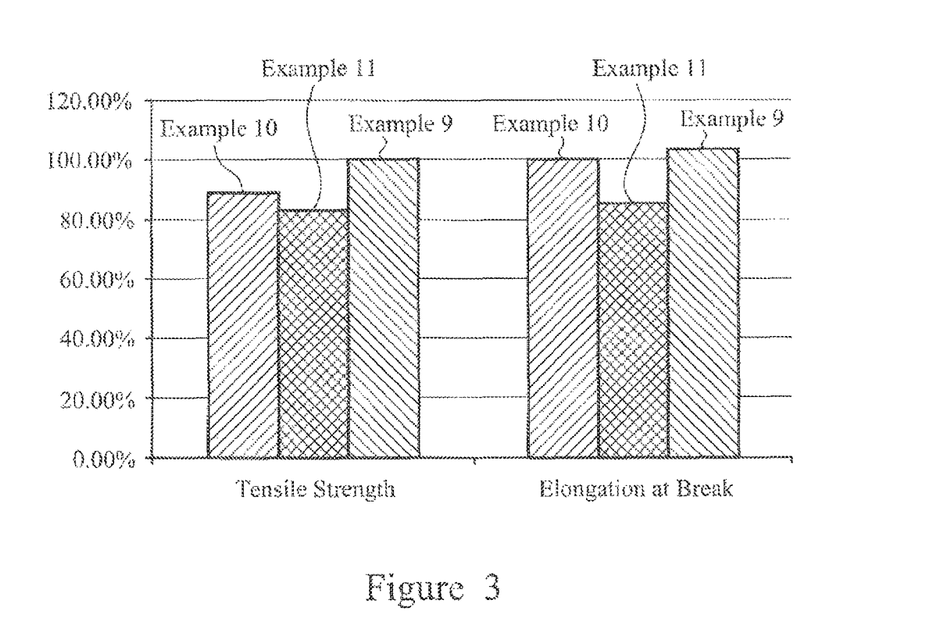
FIG. 3 is a representation of the % retention of tensile and elongation properties for various blends relative to virgin material, set at 100%.

The tensile and elongation properties of the blends were compared to corresponding virgin materials. Results are provided in FIG. 3 wherein the % retention of tensile and elongation properties relative to virgin material, set at 100%, is illustrated. It will be noted that the Example 9 materials (PEEK/PEDEK) generally retain the aforementioned mechanical properties, even when comprising 50 wt % of recycled polymer. However, it is clear from Examples 10 and 11 that mechanical properties of blends comprising recycled PEK fall off significantly as the level of recycled material is increased.

EXAMPLE 12

Assessment of other Mechanical Properties

Figure 4:
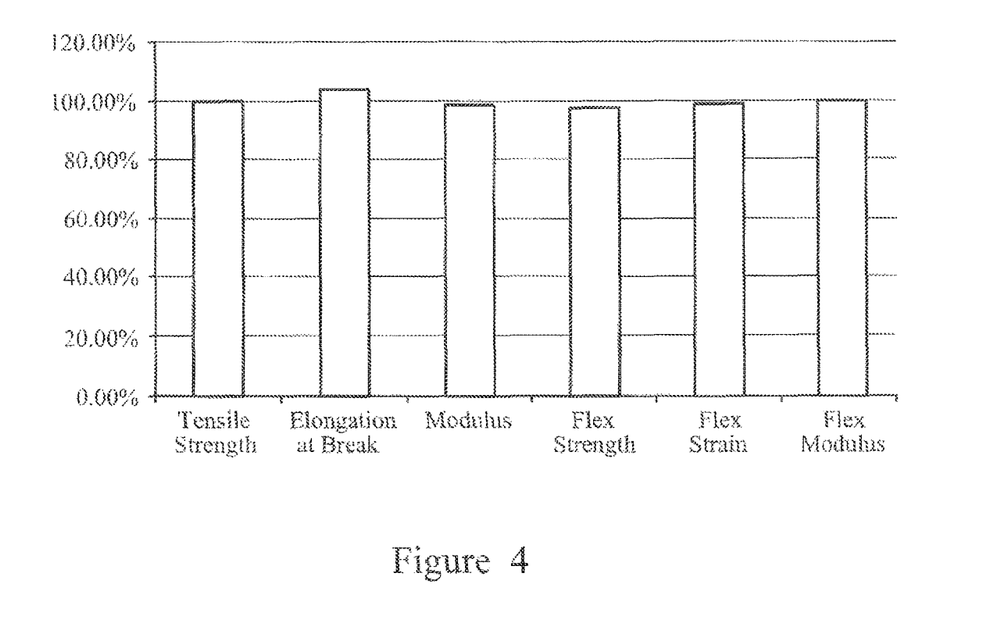
FIG. 4 is a representation of the % retention (relative to virgin material set at 100%) of a range of mechanical properties for a 50:50 blend comprising virgin and recycled polymer.

Other mechanical properties of virgin PEEK-PEDEK and blends comprising recycled PEEK-PEDEK were assessed— namely tensile modulus (in accordance with ISO527), flexural strength, flexural strain and flexural modulus (each in accordance with ISO170). FIG. 4 illustrates the results which are compared to the results for 100% virgin PEEK-PEDEK which is set out at 100% on the y axis of FIG. 4.

EXAMPLE 13

Assessment of Crystallinity

Crystallinity of samples of PEEK-PEDEK were assessed by shaving an 8 mg sample from a sample and performing a DSC analysis as described in Example 3. Results are reported in the table below for injection moulded samples, laser sintered virgin PEEK-PEDEK and a 50:50 blend of virgin and recycled PEEK-PEDEK. It will be noted that, advantageously, the crystallinity of both the virgin PEEK-PEDEK and PEEK-PEDEK blends are high and both sintered polymers have higher crystallinity than injection moulded PEEK-PEDEK.

| Material Assessed | Crystallinity (X %) Sample 1 | Crystallinity (X %) Sample 2 | Crystallinity (X %) Sample 3 | Improvement % |
|---|---|---|---|---|
| Injection Moulded | 22.55 | 21.22 | 21.885 | 0 |
| Laser Sintered (Virgin) | 25.95 | 26.41 | 26.195 | 19.69 |
| Laser Sintered (50:50 blend of virgin and recycled polymer) | 26.98 | 25.43 | 26.225 | 19.83 |

Thus, it should now be appreciated that PEEK-PEDEK polymer used in laser sintering can be advantageously recycled and blended with virgin material to produce a blend which has very similar mechanical properties and crystallinity compared to the virgin material. Thus, PEEK-PEDEK may be cost-effectively used in laser sintering.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A process for manufacturing an object, the process comprising:
   (i) selecting a powder comprising a polymeric material having a repeat unit of formula —O—Ph—O—Ph—CO—Ph—    I and a repeat unit of formula

—O—Ph—Ph—O—Ph—CO—Ph—    II wherein Ph represents a phenylene moiety; and
   (ii) selectively sintering the powder to produce the object;
   wherein said powder selected in step (i) of the process is a blend of virgin and recycled powder comprising said polymeric material; and
   wherein the tensile strength and elongation at break of the object are substantially the same as for an object made from virgin powder comprising said polymeric material without recycled powder comprising said polymeric material.

2. A process according to claim 1, wherein said repeat units I and II are in the relative molar proportions I:II of from 65:35 to 95:5.

3. A process according to claim 1, wherein said repeat unit of formula I has the structure and said repeat unit of formula II has the structure 4. A process according to claim 1, wherein said polymeric material includes at least 68 mol % of repeat units of formula III; and at least 10 mol % of repeat units of formula IV.

5. A process according to claim 4, wherein the ratio defined as the mol % of units of formula III divided by the mol % of units of formula IV is in the range 1.8 to 5.6.

6. A process according to claim 1, wherein the Tm of said polymeric material is less than 330° C. and greater than 280° C.

7. A process according to claim 1, wherein the level of crystallinity in said polymeric material in said powder is at least 15%.

8. A process according to claim 1, wherein the level of crystallinity of said polymeric material in said object is at least 15%.

9. A process according to claim 1, wherein said powder includes up to 60 wt % filler.

10. A process according to claim 1, wherein the powder comprises from 0 to 30 wt % of an absorber.

11. A process according to claim 1, wherein said powder comprises 60 to 100 wt % of said polymeric material.

12. A process according to claim 1, wherein, in the process, the powder is heated to a temperature of at least 250° C. prior to sintering and the process is carried out layer-wise in an additive process.

13. A process according to claim 1, wherein said powder has a $D_{50}$ of at least 1 pm and less than 500 μm.

14. A process according to claim 1, wherein said object is made up of at least 90 wt % of said powder.

15. A process according to claim 1, wherein step (i) of the method comprises:
   (i)* selecting a first powder comprising recycled powder and/or recycled polymeric material; and
   (i)** blending said first powder with a second powder which comprises virgin polymeric material to produce a blend so that the ratio of the parts by weight of virgin polymeric material divided by the parts by weight of recycled polymeric material is in the range 0.5 to 2.

16. A process according to claim 15, wherein said blend includes at least 30 wt % of recycled polymeric material.

17. Apparatus for carrying out the process of claim 1, wherein the apparatus includes a receptacle for containing a powder to be sintered.

18. Apparatus according to claim 17, wherein said receptacle includes a blend comprising:
   recycled polymeric material having a repeat unit of formula —O—Ph—O—Ph—CO—Ph—     I and a repeat unit of formula —O—Ph—Ph—O—Ph—CO—Ph—     II wherein Ph represents a phenylene moiety; and
virgin polymeric material having a repeat unit of formula —O—Ph—O—Ph—CO—Ph—     I and a repeat unit of formula —O—Ph—Ph—O—Ph—CO—Ph—     II wherein Ph represents a phenylene moiety.

19. An object produced by sintering powder comprising a polymeric material having a repeat unit of formula —O—Ph—O—Ph—CO—Ph—     I and a repeat unit of formula —O—Ph—Ph—O—Ph—CO—Ph—     II wherein Ph represents a phenylene moiety;
wherein the polymeric material is a blend of virgin and recycled powder of said polymeric material; and
    wherein the tensile strength and elongation at break of the object are substantially the same as for an object made from virgin powder comprising said polymeric material without recycled powder of said polymeric material.

\* \* \* \* \*